United States Patent [19]
Koizumi

[11] Patent Number: 5,650,859
[45] Date of Patent: Jul. 22, 1997

[54] IMAGE COMMUNICATION WITH FLEXIBLE LIMIT ON NUMBER OF TIMES REDIALING IS PERFORMED

[75] Inventor: Shigeru Koizumi, Urawa, Japan

[73] Assignee: Canon Kabushiki Kaisha, Shimomaruko, Japan

[21] Appl. No.: 324,486

[22] Filed: Oct. 18, 1994

Related U.S. Application Data

[63] Continuation of Ser. No. 866,497, Apr. 10, 1992, abandoned.

[30] Foreign Application Priority Data

Apr. 15, 1991  [JP]  Japan ................................. 3-080278

[51] Int. Cl.$^6$ ................................................. H04N 1/00
[52] U.S. Cl. ............................................. 358/404; 358/444
[58] Field of Search ................................. 358/433, 434, 358/435, 436, 437, 404, 444, 405; 379/100; H04M 11/00; H04N 1/00

[56] References Cited

U.S. PATENT DOCUMENTS

| | | | |
|---|---|---|---|
| 4,811,385 | 3/1989 | Watanabe | 379/100 |
| 5,038,226 | 8/1991 | Nagaishi | 358/404 |
| 5,057,941 | 10/1991 | Moriya | 358/434 |
| 5,077,787 | 12/1991 | Masatomo | 379/100 |
| 5,208,681 | 5/1993 | Yoshida | 358/444 |
| 5,221,972 | 6/1993 | Kotera | 358/434 |
| 5,223,948 | 6/1993 | Sakurai et al. | 358/404 |
| 5,237,427 | 8/1993 | Mizutani | 358/434 |
| 5,253,077 | 10/1993 | Hasegawa et al. | 358/404 |

*Primary Examiner*—Thai Q. Tran
*Assistant Examiner*—Huy Nguyen
*Attorney, Agent, or Firm*—Fitzpatrick, Cella, Harper & Scinto

[57] ABSTRACT

An image communication apparatus enhances the likelihood of successful communication with a destination station without conflict with business of other users who use the same apparatus. In the image transmission, existence of a connection with the destination station is determined after the dialing of the destination station, and if the connection fails, redialing is performed. A remaining capacity of a memory for image to be transmitted is determined, and the redialing is repeated without regard to a preset limit on the number of times of redialing, if the remaining memory capacity is sufficiently large, while redialing is performed only the preset number of times if the remaining memory capacity is not sufficiently large.

12 Claims, 2 Drawing Sheets

IMAGE COMMUNICATION WITH FLEXIBLE LIMIT ON NUMBER OF TIMES REDIALING IS PERFORMED

This application is a continuation of application Ser. No. 07/866,497 filed Apr. 10, 1992, now abandoned.

BACKGROUND OF THE INVENTION

1. Field of the Invention

The present invention relates to an image communication apparatus, and more particularly to an image communication apparatus which stores a document image to be transmitted into a memory, and transmits it to a destination station or if connection is not made to the destination station upon calling, redials the destination station.

2. Related Background Art

A facsimile apparatus having a so-called auto-redialing function to automatically call a destination station a predetermined time later when an image has not been transmitted because the destination station was busy at the time of the preceding call, and, has been known.

In the auto-redialing of the prior art facsimile apparatus, if the dialed destination station is busy or makes no response, the same destination station is automatically redialed a predetermined time (for example, two minutes) later. If there is no response again, the destination station is redialed again the same length of time later, and if there is still no response, a notice of nonreception is recorded out, and the apparatus stands by. The number of times of auto-redialing may be selected by means of software through switch manipulation or programming.

However, the prior art auto-redialing function operates only for the preset number of times of redialing. Thus, in a facsimile apparatus which frequently requires a longer communication time than a telephone set does, the probability of the destination station being busy is relatively high and, in many cases, connection may not be achieved within the preset number of times of redialing.

In this regard, the preset number of times of redialing may be increased, but when the number is too big, a memory for the image to be transmitted will overflow, and a user who wants to transmit a document (for example, a document having a higher priority) may thus be inconvenienced by the redialing for the document which has previously been instructed to be transmitted being made but stored in the memory because of no connection being made to the destination station.

A facsimile apparatus having an auto-dialing U.S. Pat. No. 4,811,385 and 5,077,787, and in U.S. application Ser. No. 663,198 (filed on Feb. 28, 1991), and U.S. application Ser. No. 627,913 (filed on Dec. 17, 1990) but no proposal to solve the above problems has been made yet.

SUMMARY OF THE INVENTION

It is an object of the present invention to improve an image communication apparatus in the light of the above problems.

It is another object of the present invention to provide an image communication apparatus which enhances an opportunity of communication with a destination station without conflicting with the business of other users who use the same apparatus.

According to one aspect of the present invention is provide an image communication apparatus which redials until connection to a destination station is made, so long as the remaining capacity of memory for storing images to be transmitted is sufficiently large, and terminates the redialing at a preset number of times if the remaining memory capacity is not sufficiently large.

Other objects features and advantages of the present invention will be apparent from the following detailed description of the preferred embodiments and the accompanying drawings.

DETAILED DESCRIPTION OF THE PREFERRED EMBODIMENT

An embodiment of the present invention is now explained in detail with reference to the drawings.

Figure 1:
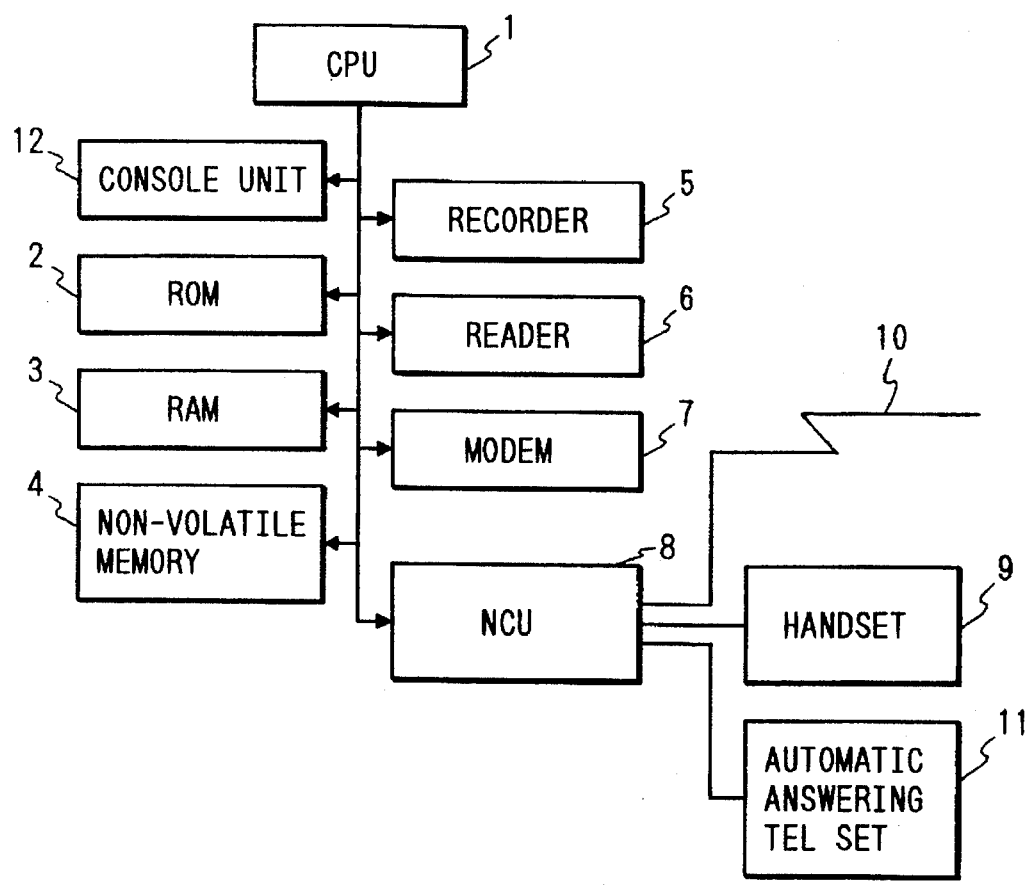
FIG. 1 shows a block diagram of a facsimile apparatus in accordance with the present invention.

FIG. 1 shows a block diagram of a facsimile apparatus in accordance with the present invention. In FIG. 1, numeral 1 denotes a CPU comprising a microprocessor for controlling the overall apparatus in accordance with a program to be described later, stored in a ROM 2. The following elements are connected to the CPU 1.

A non-volatile memory 4 stores data to be reserved even after power to the apparatus is turned off, such as telephone number registration data and registration data of software switches to be described later.

A recorder 5 reads out recorded data stored in a RAM 3 and outputs it as a hard copy, under the control of CPU 1. A reader 6 binarizes the data read by a CCD sensor and sequentially sends the binarized data to the RAM 3, under the control of the CPU 1.

A modem 7 comprises G3 (V21, V27 ter, V29), G2, G1 and FM modems which each comply with the CCITT Recommendations and a clock generator connected to the modems, and modulates the data to be transmitted stored in the RAM 3 and outputs it to a telephone line 10 through an NCU 8 under the control of the CPU 1.

The modem 7 also receives an analog signal on the line 10 through the NCU 8, demodulates and binarizes it and stores the resulting data into the RAM 3. The modem 7 is further provided with a calling signal detector 15 for detecting a calling signal supplied from the line 10.

The NCU 8 selectively connects the line 10 to the modem 7 or an automatic answering/recording telephone set 11 under the control of the CPU 1.

The apparatus is equipped with a handset (or telephone set) 9 by which communication reservation is mode in a facsimile communication mode.

A console unit 12 comprises various key entry switches and displays.

Figure 2:
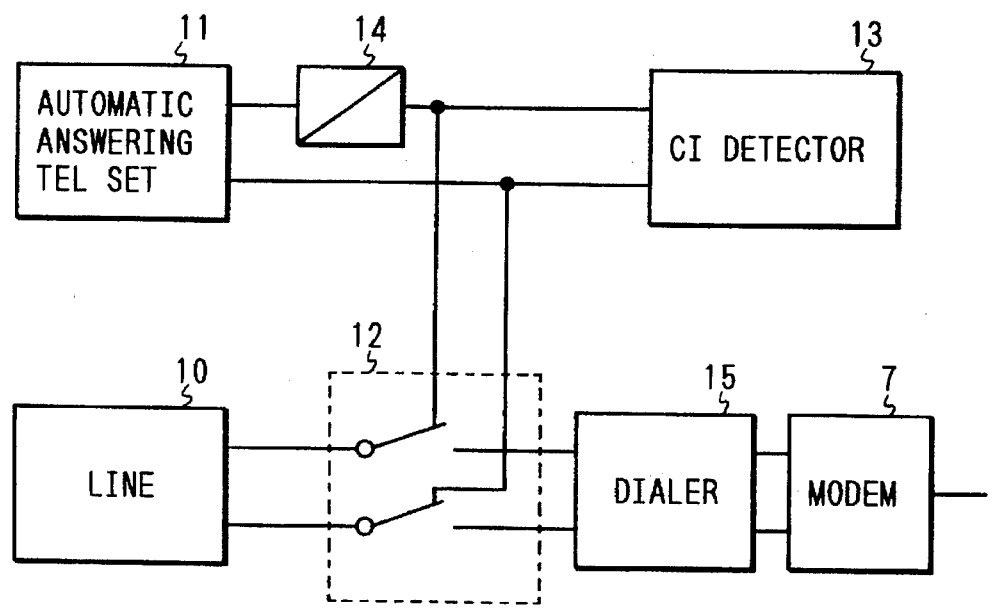
FIG. 2 shows a block diagram of a line controller of the apparatus of FIG. 1.

A configuration of a line controller of the NCU 8 is shown in FIG. 2.

As shown in FIG. 2, the line 10 is connected to either the modem 7 of the facsimile apparatus or the line of the automatic answering/recording telephone set 11, by a CML relay 12. A sensor 14a of an offhook detector 14 for detecting an off-hook status of the automatic answering/recording telephone set 11 is connected to the line of the automatic answering/recording telephone set 11.

The off-hook detector 14 is used to detect whether the automatic answering/recording telephone set 11 responds when a user picks up the handset of the automatic answering/recording telephone set 11 or when the automatic answering/recording telephone set 11 is started by a calling signal from the line.

First, the user registers a limit on number of times redial is to be permitted, into the non-volatile memory 4 by means of a soft ware switch, by manipulating the console unit 12 or a ten-key or a function key of the handset 9 or 11.

In a stand-by mode, the line 10 is connected to the handset 11 by the CML relay 12.

Operation of the circuit is explained with reference to FIG. 3.

Figure 3:
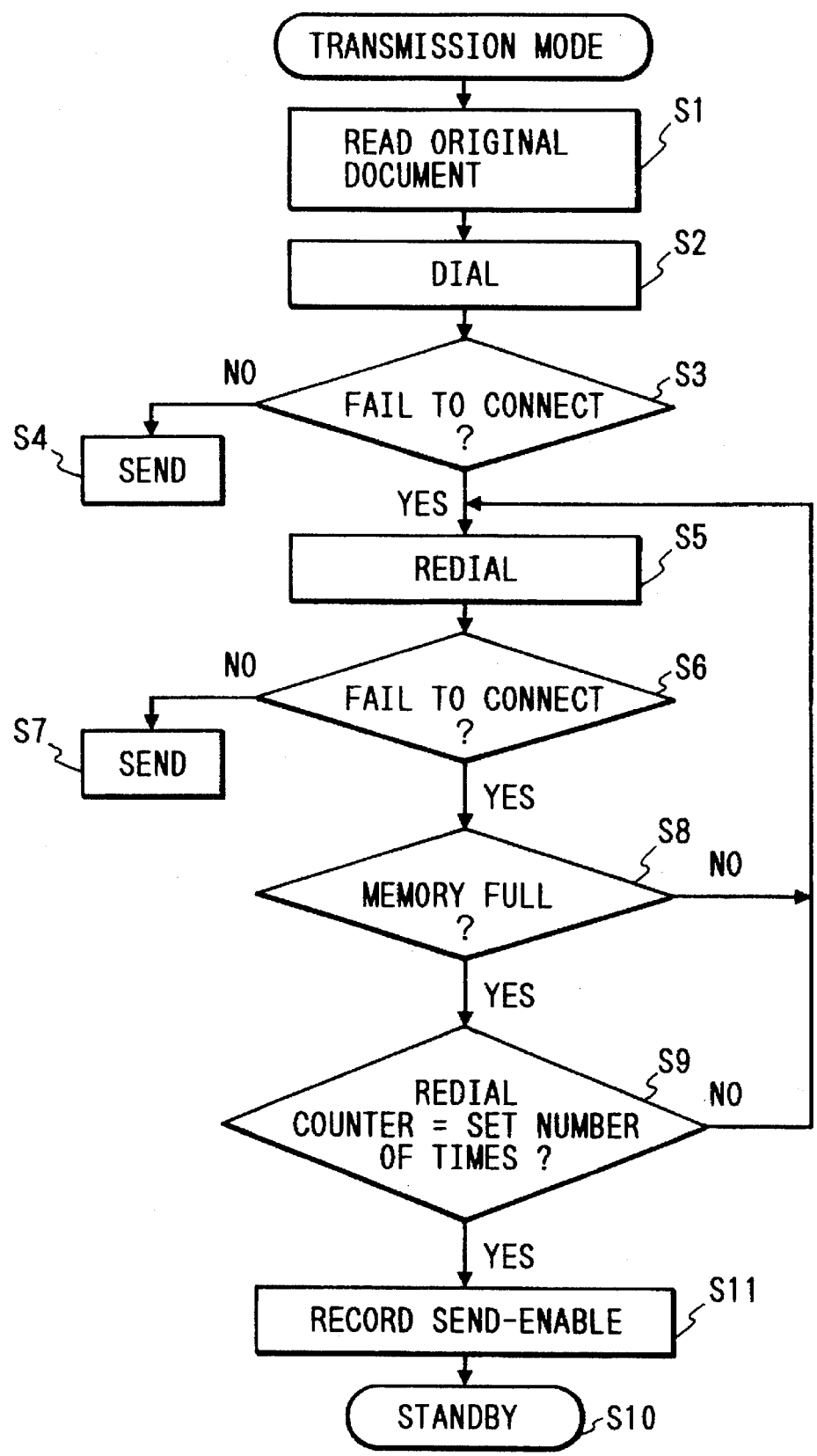
FIG. 3 shows a flow chart of a control procedure of a CPU of FIG. 1.

The CPU 1 reads a document in a step S1 of FIG. 3 and stores it into the non-volatile memory 4 (or the RAM 3).

In a step S2, a destination station is dialed by the dialing circuit 15. In a step S3, whether the destination station responds (either giving a busy signal or allowing connection) or not is determined. If the destination station responds, the process proceeds to a step S4 to transmit the document image stored in the nonvolatile memory 4 (or the RAM 3).

However, if the destination station does not respond in the step S3, the process proceeds to a step S5 to start a redial mode in which the call is made again like in the step S2 a predetermined time (two minutes) later.

If the destination station responds in a 1 step S6, the document image stored in the non-volatile memory 4 (or the RAM 3) is transmitted in a step S7.

On the other hand, if the destination station does not respond in the step S6, the redial mode is started. The process returns to the step S5 to redial the predetermined time (two minutes) later, after decisions in steps S8 and S9.

In the step S8, because there is a possibility that another user may set a document to be transmitted during the predetermined time, a check is made as to whether or not the remaining capacity of the document memory which may be the RAM 3 or the non-volatile memory 4, is large enough (for example, sufficient for image data of same average number of sheets of one document. This may be done by address calculation of pointers which indicate a free area of the RAM 3 or the non-volatile memory 4.

This is done in order to avoid, as much as possible, non-acceptance of documents of other users due to overflow of the memory. If it is determined that the remaining memory capacity is sufficiently large that other users may not be inconvenienced in this fashion, the process returns to the step S5 to repeat the redial mode without regard to the limit on the number of times of redial stored in the non-volatile memory 4.

Thus, so long as the remaining capacity of the memory for the document to be transmitted is sufficiently large, the redialing is performed without limit and without regard to the number of times of redial preset by the software switch.

On the other hand, if the remaining memory capacity is small, a counter for counting the number of times redial has been performed (which comprises the RAM 3 or a register of the CPU 1) is incremented at each redial and whether the count is equal to the number of times of redial preset in the non-volatile memory 4 or not, is determined in a step S11. If it is determined that the predetermined number of times of redial has been made to one destination station, the redialing is terminated, and the recorder 5 outputs a notice of non-reception (which may be either display output, an alarm sound, or both) in a step S11, and the process proceeds to the stand-by step S10.

Thus, if the remaining capacity of the memory for the document to be transmitted is not sufficiently large, redialing is performed only number of times of redial preset by the software switch, as is done in the prior art apparatus.

In accordance with the present invention, the probability of successively transmitting the document to the destination station is enhanced because redialing is performed without limit and without regard to the number of times of redial preset by the software switch, so long as the remaining capacity of the memory for the document to be transmitted is sufficiently large.

Further, if the remaining capacity of the memory is not sufficiently large, redialing is performed only the number of times of redial preset by the software switch, as is done in the prior art apparatus. Accordingly, the non-transmission or delay of transmission of another document which may have a higher business priority by the transmission of a previously set document to a hard-to-connect destination station is avoided.

The present invention provides an image communication apparatus which enhances the likelihood of success of image transmission without conflict between users in an environment in which a number of users use one apparatus or a document is to be repeatedly transmitted to a number of destination stations.

The present invention is not limited to the illustrated embodiment, but various modifications thereof may be made.

What is claimed is:

1. An image communication apparatus comprising:

calling means for calling a destination station;

determining means for determining whether or not the destination station responds to a call made by said calling means;

input means for inputting image data to be transmitted;

memory means for storing the image data input by said input means;

means for transmitting the image data stored in said memory means;

means for detecting a remaining capacity of said memory means; and control means for changing a number of times said calling means recalls the destination station, in accordance with the remaining capacity of said memory means as detected by said detecting means, when the destination station does not respond to a call as determined by said determining means.

2. An image communication apparatus according to claim 1, wherein said control means causes recalling until the destination station responds, when the remaining memory capacity is no smaller than a predetermined amount, and terminates recalling at a predetermined number of times, when the remaining memory capacity is smaller than the predetermined amount.

3. An image communication apparatus according to claim 2, further comprising means for outputting information noticing the termination of recalling, when the recall is terminated without transmission of the image data.

4. An image communication apparatus according to claim 2, further comprising means for manually setting said predetermined number of times.

5. An image communication apparatus for dialing a destination station, transmitting an image stored in a memory to the destination station and redialing the destination station when the destination station does not respond to a call, said apparatus comprising:

means for dialing the destination station;

means for setting the number of times of redial;

means for detecting a remaining capacity of the memory; and means for causing said dialing means to redial the destination station without regard to the number of times of redial set by said setting means when said detection means detects that the remaining capacity of the memory is larger than a predetermined amount, and causing said dialing means to redial the destination station the number of times of redial set by said setting means when the remaining capacity of the memory for the image to be transmitted is smaller than the predetermined amount in a case where the destination station does not respond to a dialing.

6. An image communication apparatus according to claim 5, further comprising means for outputting information noticing the non-response by the destination station when the destination does not respond to the dialing after the number of times of redial set by said setting means.

7. A method for transmitting image data, comprising the steps of:

storing the image data into a memory;

detecting a remaining capacity of the memory;

calling a destination station;

determining whether or not the destination station responds to a call; and changing a number of times of recalling the destination station in accordance with the remaining capacity of the memory when the destination station does not respond to a call as determined in a said determining step.

8. A method for transmitting image data, comprising the steps of:

storing the image data into a memory;

detecting a remaining capacity of the memory;

calling a destination station;

determining whether or not the destination station responds to a call; and controlling a number of times of recalling the destination station in accordance with the remaining capacity of the memory when the destination station does not respond to a call as determined in said determining step, wherein recalling is performed until the destination station responds to the call, when the remaining capacity of said memory is not smaller than a predetermined amount, and the recalling is performed a predetermined number of times, when the remaining capacity of the memory is smaller than the predetermined amount.

9. A method for transmitting image data according to claim 8, wherein information noticing the termination of recalling is output when recalling is terminated without transmission of the image data.

10. An image transmission apparatus comprising:

memory means for storing image data;

detecting means for detecting a remaining capacity of said memory means;

calling means for calling a destination station;

determining means for determining whether or not the destination station responds to a call made by said calling means; and means for changing the number of times of recall by said calling means in accordance with the remaining capacity of said memory means, when the designation station does not respond to a call made by said calling means as determined by said determining means.

11. An image transmission apparatus according to claim 10, wherein recalling by said calling means is made until the destination station responds to the call, when the remaining capacity of said memory means is no smaller than a predetermined amount, and the recalling is made a predetermined number of times when the remaining capacity of said memory means is smaller than the predetermined amount.

12. An image transmission apparatus according to claim 11, further comprising output means for outputting information noticing the termination of recalling when the recalling is terminated without transmission of the image data.

* * * * *

UNITED STATES PATENT AND TRADEMARK OFFICE
CERTIFICATE OF CORRECTION

PATENT NO. : 5,650,859
DATED : July 22, 1997
INVENTOR(S) : SHIGERU KOIZUMI

It is certified that error appears in the above-identified patent and that said Letters Patent is hereby corrected as shown below:

ON TITLE PAGE AT [73] ASSIGNEE

"Shimomaruko," should read --Tokyo,--.

ON TITLE PAGE AT [56] REFERENCES CITED

"Mizutari" should read --Mizutori--.

COLUMN 1

Line 13, "station or" should read --station, or--;

COLUMN 3

Line 29, "1 step" should read --step--.

Signed and Sealed this

Twenty-second Day of December, 1998

Attest:

BRUCE LEHMAN

*Attesting Officer*     *Commissioner of Patents and Trademarks*